(12) United States Patent
Yamada

(10) Patent No.: US 12,278,540 B2
(45) Date of Patent: Apr. 15, 2025

(54) COOLING STRUCTURE OF VERTICAL MOTOR

(71) Applicant: Honda Motor Co., Ltd., Tokyo (JP)

(72) Inventor: Satoshi Yamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 17/955,483

(22) Filed: Sep. 28, 2022

(65) Prior Publication Data

US 2024/0106299 A1    Mar. 28, 2024

(51) Int. Cl.
*H02K 9/19*      (2006.01)
*H02K 5/20*      (2006.01)

(52) U.S. Cl.
CPC .............. *H02K 5/203* (2021.01); *H02K 9/19* (2013.01)

(58) Field of Classification Search
CPC ........... H02K 5/203; H02K 3/522; H02K 9/19
See application file for complete search history.

(56) References Cited

U.S. PATENT DOCUMENTS

| | | | |
|---|---|---|---|
| 2010/0045125 A1* | 2/2010 | Takenaka | H02K 9/19 310/54 |
| 2013/0049496 A1* | 2/2013 | Chamberlin | H02K 3/24 310/54 |
| 2013/0147289 A1* | 6/2013 | Burger | H02K 15/00 29/596 |
| 2020/0383267 A1* | 12/2020 | Nishimura | A01D 34/828 |
| 2022/0255403 A1* | 8/2022 | Mihara | H02K 9/197 |

FOREIGN PATENT DOCUMENTS

JP      2015198538      11/2015

* cited by examiner

*Primary Examiner* — Leda T Pham
(74) *Attorney, Agent, or Firm* — JCIPRNET

(57) ABSTRACT

A vertical motor with a cooling structure for an electrical operation machine is provided. The vertical motor includes a driving shaft, having a rotational axis and arranged along a vertical direction; a rotor, rotating with the driving shaft; a stator, arranged around the rotor; a winding, arranged around the stator; a housing, having a wall portion and a bottom portion and accommodating the driving shaft, the rotor and the stator; and an oil sump, provided on the bottom portion of the housing for accumulating a cooling fluid in a manner that a lower portion of the winding is immersed in the cooling fluid. The oil sump has an inner peripheral side wall, the inner peripheral side wall is vertically arranged with respect to the bottom portion of the housing and positioned at an inner side than the lower portion of the winding.

13 Claims, 8 Drawing Sheets

COOLING STRUCTURE OF VERTICAL MOTOR

BACKGROUND

Technical Field

The invention relates to a motor structure and particularly relates to a cooling structure for a vertical motor.

Description of Related Art

FIG. 1A illustrates a flow path of an automatic transmission fluid (ATF) for a horizontal motor. FIG. 1B and FIG. 1C illustrate a concentrated winding stator. In the motor, a concentrated winding stator as shown in FIGS. 1B and 1C (viewed from two opposite side of the rotor) can be used. As shown in FIG. 1A, the motor is placed horizontally (horizontal motor). When cooling a motor, the ATF that also serves as cooling fluid is discharged to the coil, and the downward flow of the ATF flow can distribute the ATF (cooling fluid) throughout the motor, so as to cool the motor.

However, the method of using to flow of the cooling liquid to spread over the entire motor can be used for horizontal motors, but cannot be used for vertical motors.

As shown in FIG. 2, when the motor 10 is vertically placed, the winding (coil) 16 on the top of the motor 10 can be cooled by the ATF (cooling fluid) dripped from above (refer to the flow F). However, the winding (coil) 16 on the bottom of the motor 10 cannot be cooled unless the ATF is accumulated in the housing of the motor 10. However, the accumulated ATF enters the rotor 14 side, the lower portion of the rotor 14 is also immersed in cooling fluid CF, so as to increase friction against the rotor or the driving shaft of the motor 10.

Therefore, it is necessary to develop a cooling structure for the vertical motor using the ATF as the cooling fluid.

SUMMARY

In view of to the above description and according to one embodiment, the disclosure provides a vertical motor with a cooling structure for an electrical operation machine. The vertical motor comprises: a driving shaft, having a rotational axis and arranged along a vertical direction; a rotor, rotating with the driving shaft; a stator, arranged around the rotor; a winding, arranged around the stator; a housing, having a wall portion and a bottom portion and accommodating the driving shaft, the rotor and the stator; and an oil sump, provided on the bottom portion of the housing for accumulating a cooling fluid in a manner that a lower portion of the winding is immersed in the cooling fluid. The oil sump has an inner peripheral side wall, the inner peripheral side wall is vertically arranged with respect to the bottom portion of the housing and positioned at an inner side than the lower portion of the winding.

In one embodiment, the rotor is arranged between an upper end plate and a lower end plate, a step portion is formed at an outer rim of the lower end plate, and the inner peripheral side wall is aligned with the step portion.

In one embodiment, the oil sump further comprises an outer peripheral side wall, and a height of the inner peripheral side wall is higher than the outer peripheral side wall.

In one embodiment, the inner peripheral side wall further comprises a vertical wall portion and an overhanging portion, wherein the overhanging portion is arranged at a top of the vertical wall portion and is arranged in a manner that the overhanging portion is inclined towards the stator.

In one embodiment, the inner peripheral side wall further comprises a vertical wall portion and an overhanging portion, wherein the overhanging portion is arranged at a top of the vertical wall portion and is arranged in a manner that the overhanging portion is inclined towards the stator, and an end portion of the overhanging portion is aligned with the step portion.

In one embodiment, the inner peripheral side wall may be vertically arranged with respect to the bottom portion of the housing and a top of the inner peripheral side wall may be aligned with an outer rim of the rotor.

In one embodiment, the cooling fluid may flow from above the stator in the vertical direction. In one embodiment, the cooling fluid may be injected from an outside of the stator to an inside of the rotor substantially in a direction to the vertical direction.

In one embodiment, the electrical operation machine is a boat, an electrical lawn mower, or the like.

In the above embodiment, the oil sump is provided with an inner peripheral side wall and an outer peripheral side wall in a manner that the winding (coil) may be surrounded by the inner and the outer peripheral side walls. Since the inner peripheral side wall is higher, when the amount of the cooling liquid exceeds a certain amount, it prevents the overflowed cooling liquid from entering the rotor side, so as to reduce the friction against the rotor or the driving shaft.

DESCRIPTION OF THE EMBODIMENTS

Figure 3:
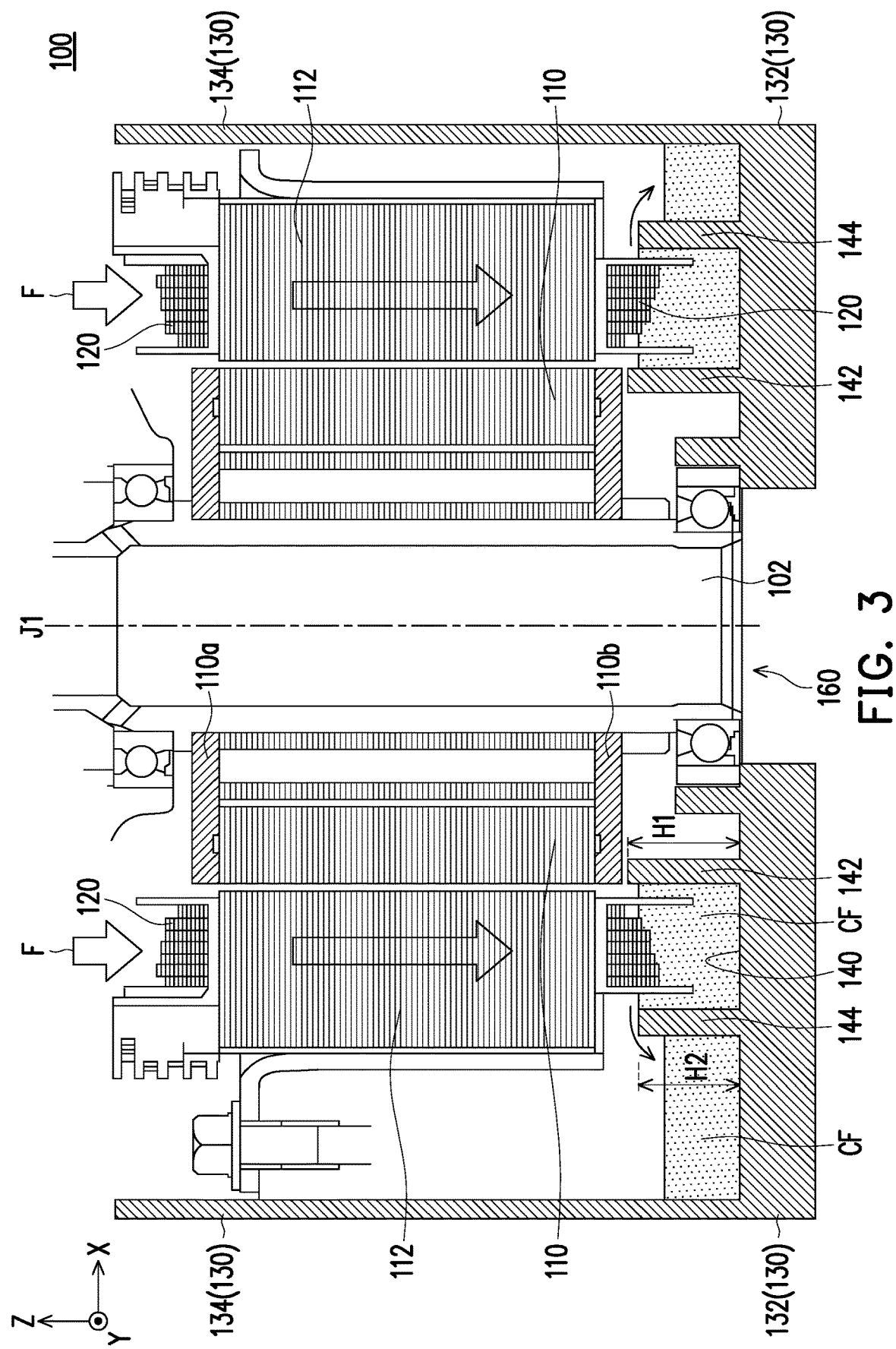
FIG. 3 illustrates a schematic cross-sectional view of a vertical motor having a cooling structure according to one embodiment of the disclosure.

FIG. 3 illustrates a schematic cross-sectional view of a vertical motor having a cooling structure according to one embodiment of the disclosure. Only the major portions related to the disclosure is depicted in FIG. 3.

The vertical motor (hereinafter, motor for simplicity) 100 may be used for an outboard motor that is mounted on a boat. In FIG. 3, the motor 100 has a driving shaft 102 capable of rotating around a rotational axis J1 in the direction Z (the vertical direction). The rotor 110 is provided around the driving shaft 102 and capable of rotating with respective to the driving shaft 102. In addition, the rotor 110 further comprise an upper end plate 110a and a lower end plate 110b and the rotor body of the rotor 110 is provided between the upper end plate 110a and the lower end plate 110b.

Figure 1A:
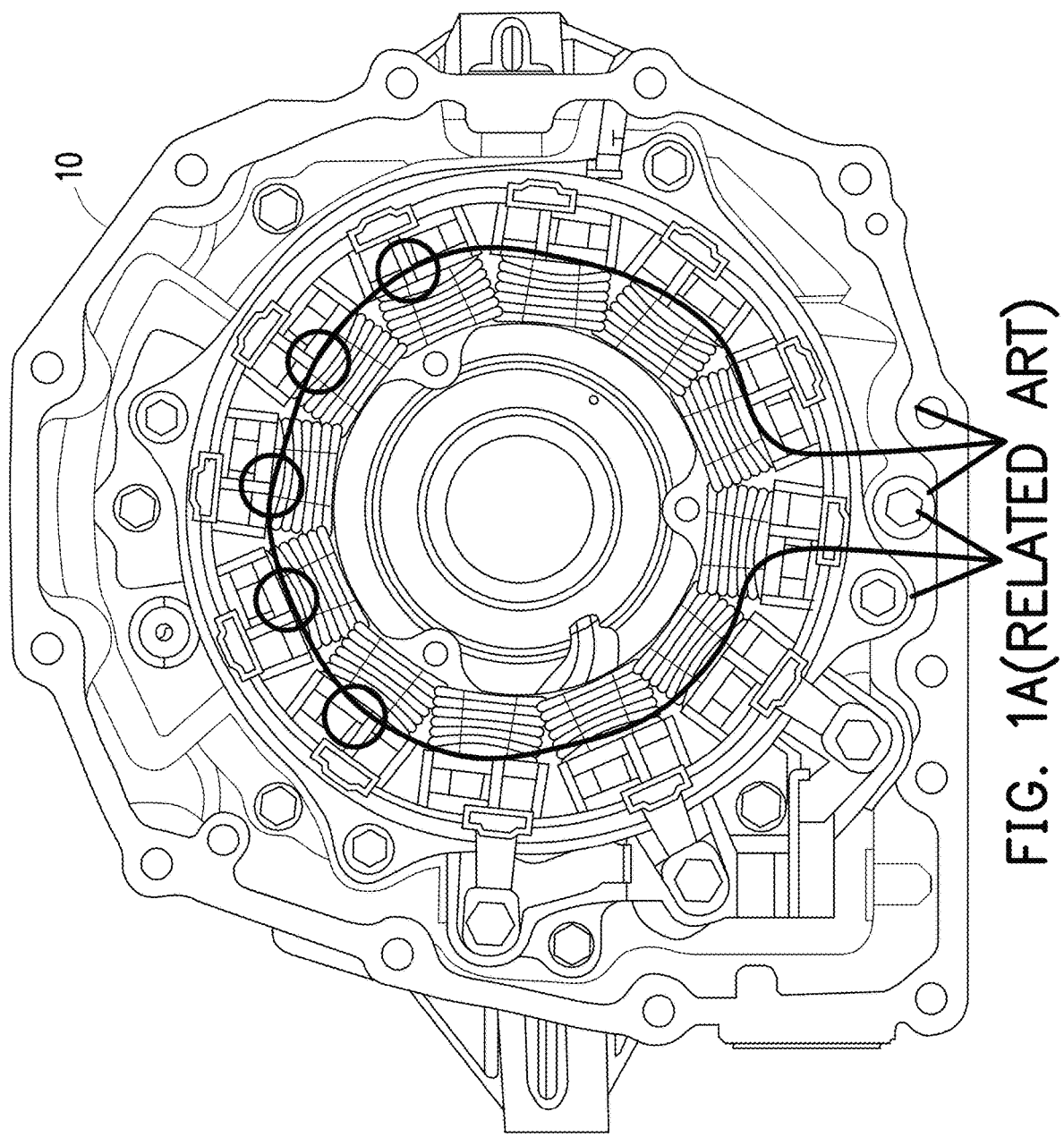
FIG. 1A illustrates a flow path for a horizontal motor.
Figure 1B:
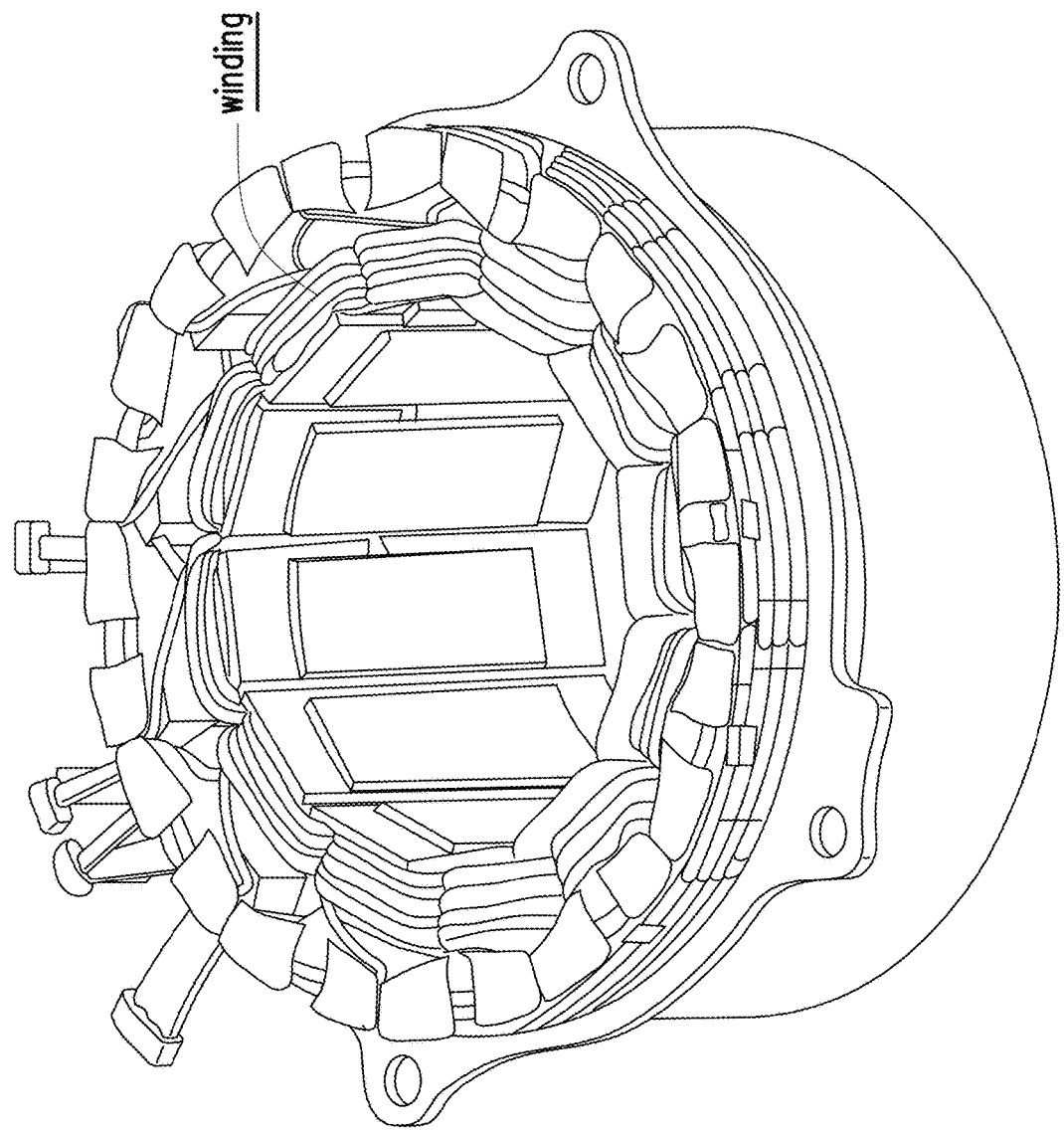
FIG. 1B and FIG. 1C illustrate a concentrated winding stator.
Figure 1C:
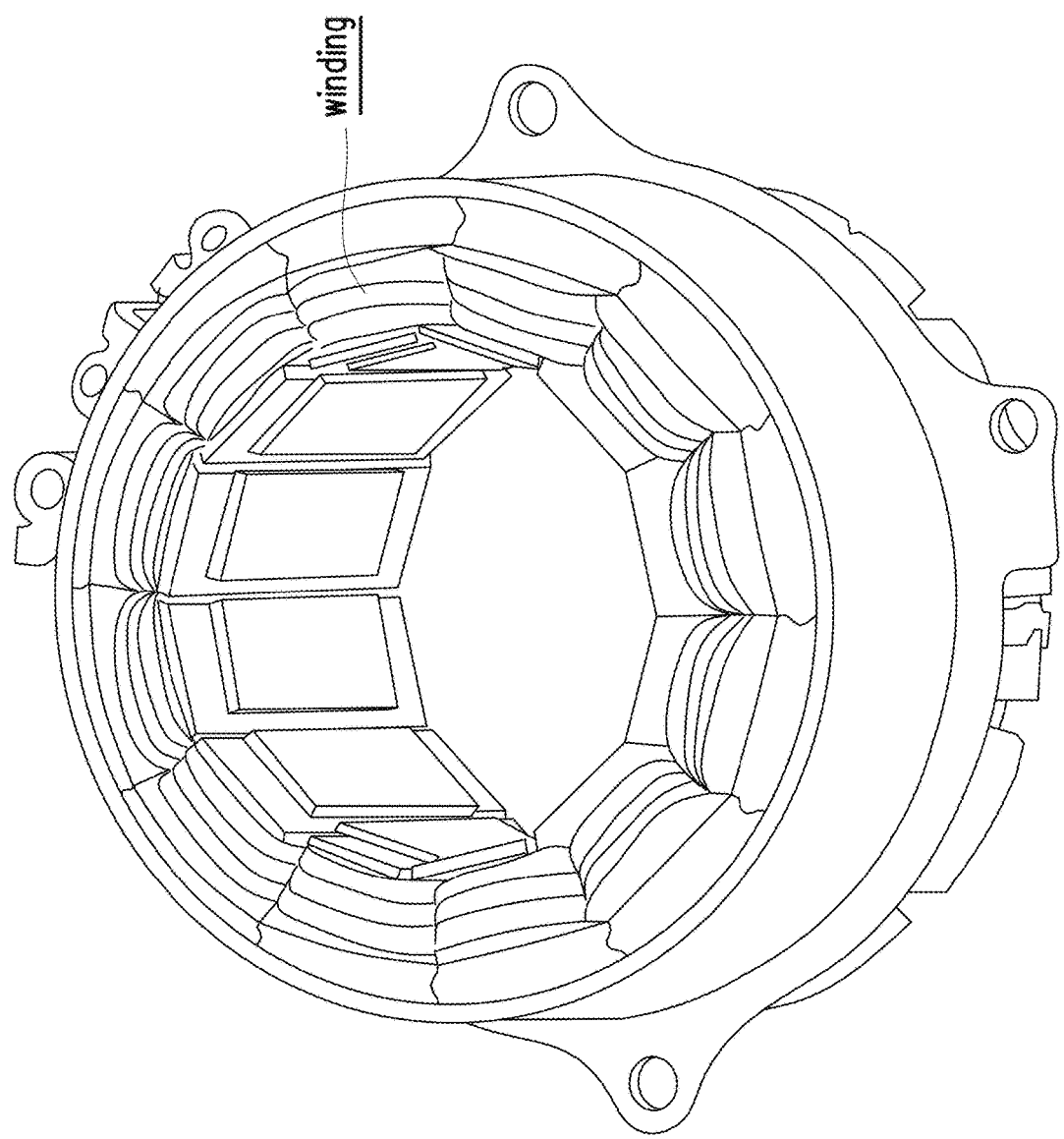
Figure 2:
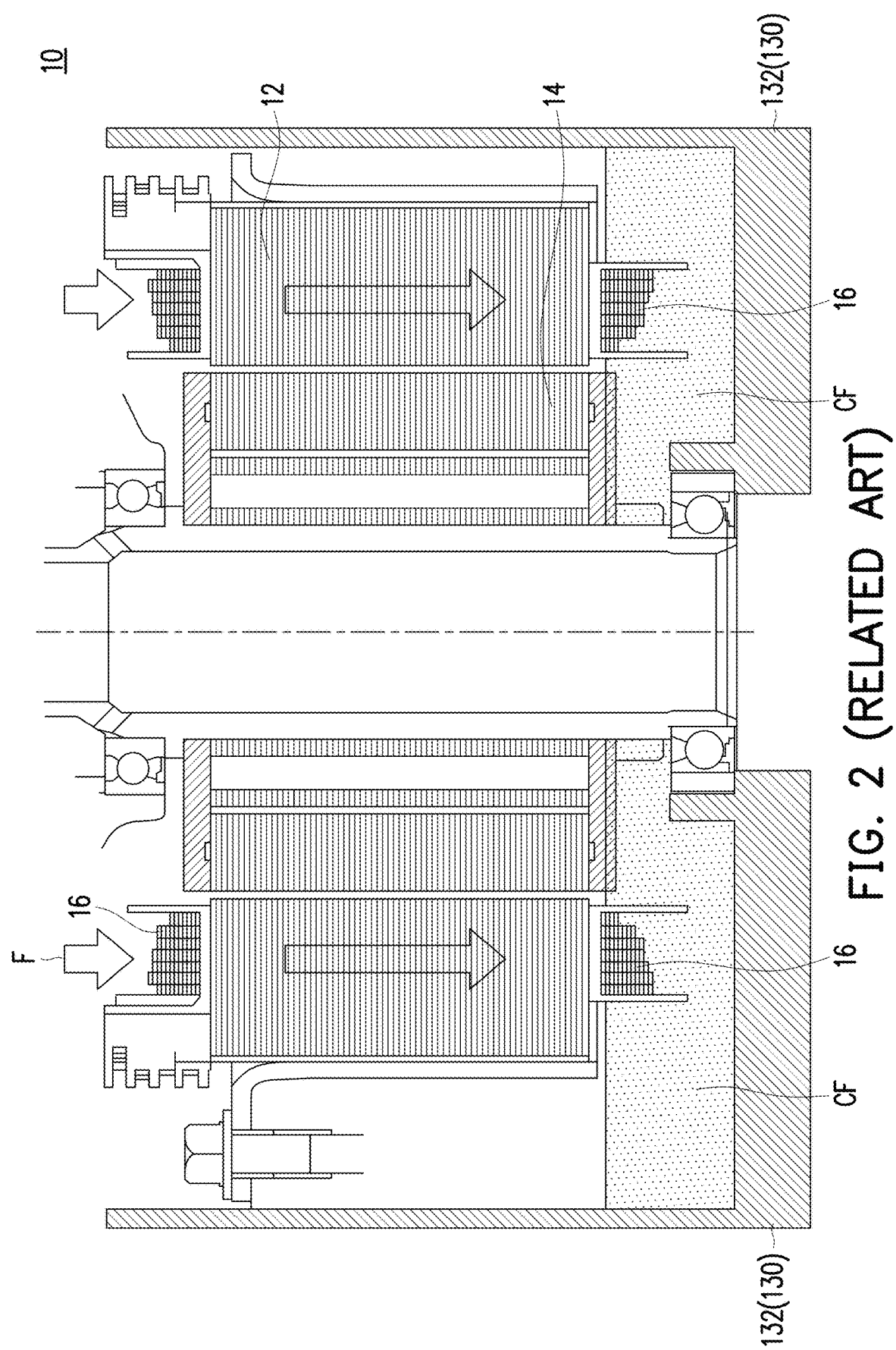
FIG. 2 illustrates the issue that the vertical motor has.

The stator 112 is provided in a fixed manner and around the rotor 110. In addition, a winding 120 is arranged around the stator 122. For example, the stator 110 may be a concentrated winding stator as shown in FIGS. 1B and 1C.

The housing 130 is used to accommodate the components of the vertical motor 100, such as the rotor 110, the stator 112 and winding 120, etc. The housing 130 comprises a wall portion 134 and a bottom portion 132 having a hole 160, and the wall portion 134 is arranged to be formed on the outer rim of the bottom portion 132 to form a hollow structure with bottom for accommodating the components of the vertical motor 100. For example, the hollow structure may be a hollow cylindrical structure.

An oil sump 140 is provided on the bottom portion 132 of the housing 130. The oil sump 140 comprises a least an inner peripheral side wall 142 with a height H1. The inner peripheral side wall 142 is vertically (the direction Z or slightly inclined) arranged with respect to the bottom portion 132 of the housing 130. The inner peripheral side wall 142 may be positioned at an inner side than the lower portion of the winding 120. In one example, the inner peripheral side wall 142 is vertically arranged with respect to the bottom portion 132 of the housing 132 and a top of the inner peripheral side wall 142 is aligned with an outer rim of the rotor 110.

During the operation of the vertical motor 100, the automatic transmission fluid (ATF, i.e., the cooling fluid) is discharged to an upper portion of the winding (coil) 120 at the stator 112, and then the flow F of the cooling fluid flows downward in the direction Z (i.e., the vertical direction) and reaches a lower portion of the winding 120. Eventually, the cooling fluid CF is accumulated in the oil sump 140. The lower portion of the winding 120 is then immersed in the oil sump 140. Therefore, the winding 120 as well as the entire vertical motor 100 can be cooled.

In addition, due to the inner peripheral side wall 142 being closed to the lower end plate 110b of the rotor 110, the accumulated cooling fluid CF doe not overflow across the inner peripheral side wall 142. Namely, the inner peripheral side wall 142 of the oil sump 140 has a function of blocking the cooling fluid CF in the oil sump 140 from flowing towards the driving shaft 102. As a result, the accumulated cooling fluid CF does not enter the rotor side, and the friction against the driving shaft can be reduced.

Therefore, according to this embodiment of the oil sump 140, the AFT can be used as the cooling fluid in the vertical motor 100 and the rotation of the driving shaft 102 can be also smooth.

In one example, the oil sump 140 may further comprise an outer peripheral side wall 144 with a height H2. The outer peripheral side wall 144 is also vertically arranged in the direction Z with respect to the bottom portion 132 of the housing 130. The outer peripheral side wall 144 is farther from the driving shaft 102 than the inner peripheral side wall 142. The outer peripheral side wall 144 and the inner peripheral side wall 142 are arranged in a manner that the winding 120 is located between the outer peripheral side wall 144 and the inner peripheral side wall 142. Therefore, when the cooling fluid CF is accumulated in the oil sump 140 surrounded by the outer peripheral side wall 144 and the inner peripheral side wall 142, the lower portion of the winding (coil) 120 can be well immersed in the cooling fluid CF and the cooling effect is improved.

The height H1 of the inner peripheral side wall 142 is higher than the height H2 of the outer peripheral side wall 144. Since the height H1 of the inner peripheral side wall 142 is higher, after the accumulated cooling fluid becomes a certain amount or level, the accumulated cooling fluid flows across the outer peripheral side wall 144 towards the outer side of the stator 112, i.e., towards the wall portion 134 of the housing 130.

According to the embodiment, since the height H2 of the outer peripheral side wall 144 is lower than the height H1 of the inner peripheral side wall 142, when the cooling fluid CF exceeds a certain amount, the structure of the oil sump 140 can prevent the overflow cooling fluid from flowing to the rotor side and the friction to the rotor 110 (or the driving shaft 102) can be reduced. In addition, by proving the outer peripheral side wall 144 and the inner peripheral side wall 142 of the oil sump 140 on the outer and inner circumferences of the lower portion of the winding (coil) 120, the cooling performance can be improved by immersing the winding (coil) 120 in the cooling fluid CF that is accumulated in the oil sump 140.

Figure 4:
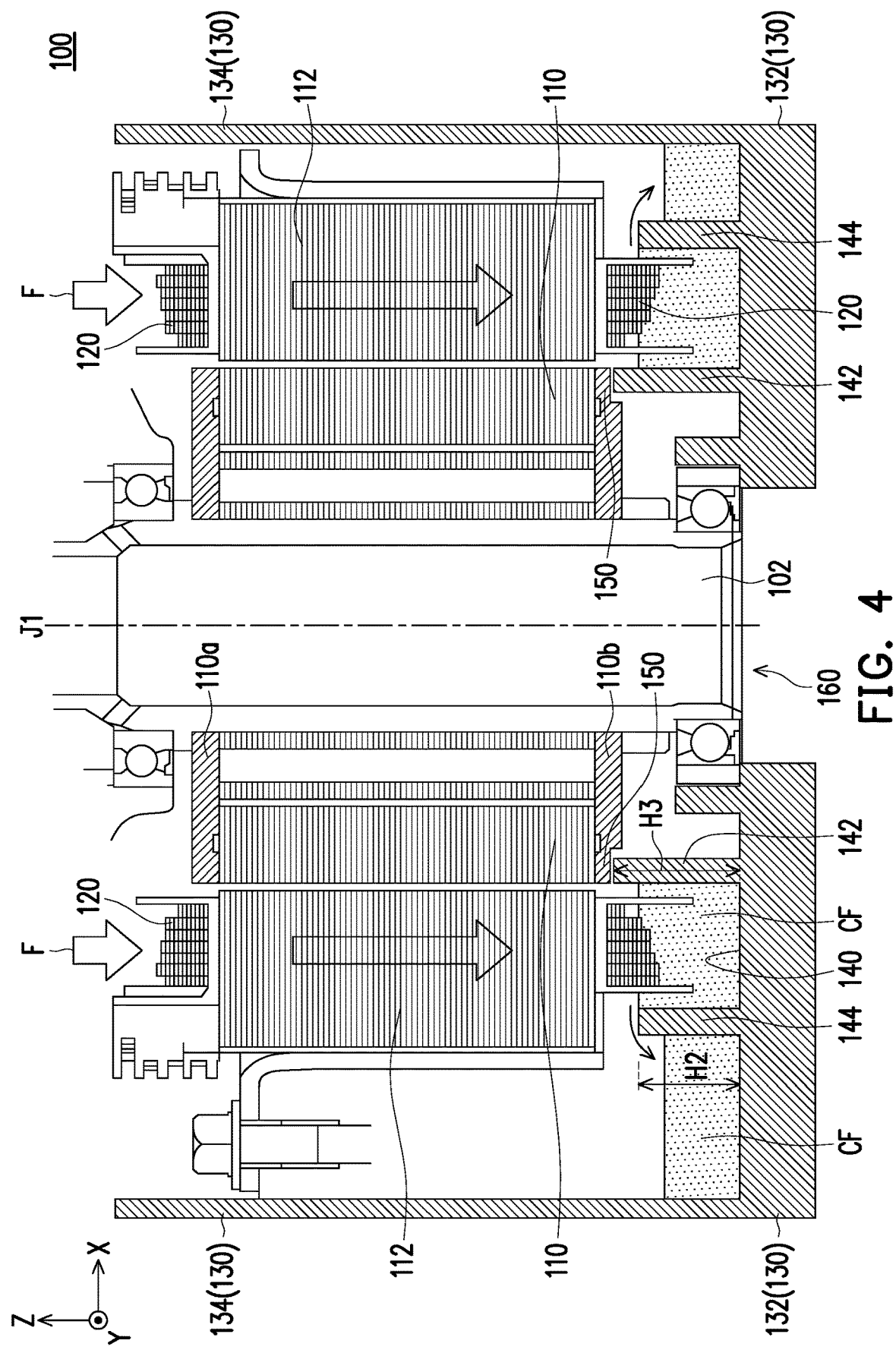
FIG. 4 illustrates a schematic cross-sectional view of a vertical motor having a cooling structure according to another embodiment of the disclosure.

FIG. 4 illustrates a schematic cross-sectional view of a vertical motor having a cooling structure according to another embodiment of the disclosure. The structure shown in FIG. 4 is a modified structure of FIG. 3.

In FIG. 4, like the embodiment shown in FIG. 3, the oil sump 140 also comprises an inner peripheral side wall 142 with a height H1 and an outer peripheral side wall 144 with a height H2. Both the inner peripheral side wall 142 and the outer peripheral side wall 144 are vertically arranged in the direction Z with respect to the bottom portion 132 of the housing 130. In this embodiment, similarly, the height H1 of the inner peripheral side wall 142 is higher than the height H2 of the outer peripheral side wall 144, so that the accumulated cooling fluid CF does not enter the rotor side.

In addition, the outer peripheral side wall 144 is farther from the driving shaft 102 than the inner peripheral side wall 142. The outer peripheral side wall 144 and the inner peripheral side wall 142 are arranged in a manner that the winding 120 is located between the outer peripheral side wall 144 and the inner peripheral side wall 142. Therefore, when the cooling fluid CF is accumulated in the oil sump 140 surrounded by the outer peripheral side wall 144 and the inner peripheral side wall 142, the lower portion of the winding (coil) 120 can be well immersed in the cooling fluid CF and the cooling effect is improved.

In FIG. 4, a step portion 150 is further formed at the outer rim of the lower end plate 110b of the rotor 110. As described, the inner peripheral side wall 142 is vertically arranged in the direction Z with respect to the bottom portion 132 of the housing 130, and further is aligned with the step portion 150 of the lower end plate 110b of the rotor 110. In this manner, in comparison with structure shown in FIG. 3, the inner peripheral side wall 142 may further extending to the lower end plate 110b of the rotor 110, i.e., the height H3 of the inner peripheral side wall 142 may be higher than the height H1 of the inner peripheral side wall 142.

In addition, a gap between the top of the inner peripheral side wall 142 and the step portion 150 of the lower end plate 110b of the rotor is arranged without affecting the rotation of the rotor 110.

Due to the step portion 150, the height H3 of the inner peripheral side wall 142 may be made higher, and thus this structure can further prevent the accumulated cooling fluid CF from entering the rotor side, and the friction against the driving shaft can be reduced.

In addition, although both of the outer peripheral side wall 144 and the inner peripheral side wall 142 are depicted in FIG. 4, but the step portion 150 of the lower end plate 110b of the rotor 110 can be applied to the oil sump 140 without the outer peripheral side wall 144.

In addition to the effects in the embodiment shown in FIG. 3, by providing a higher inner peripheral side wall 142, the friction against the rotor 110 (or the driving shaft 102) can be reduced and the operation of the vertical motor can be smoother.

Figure 5:
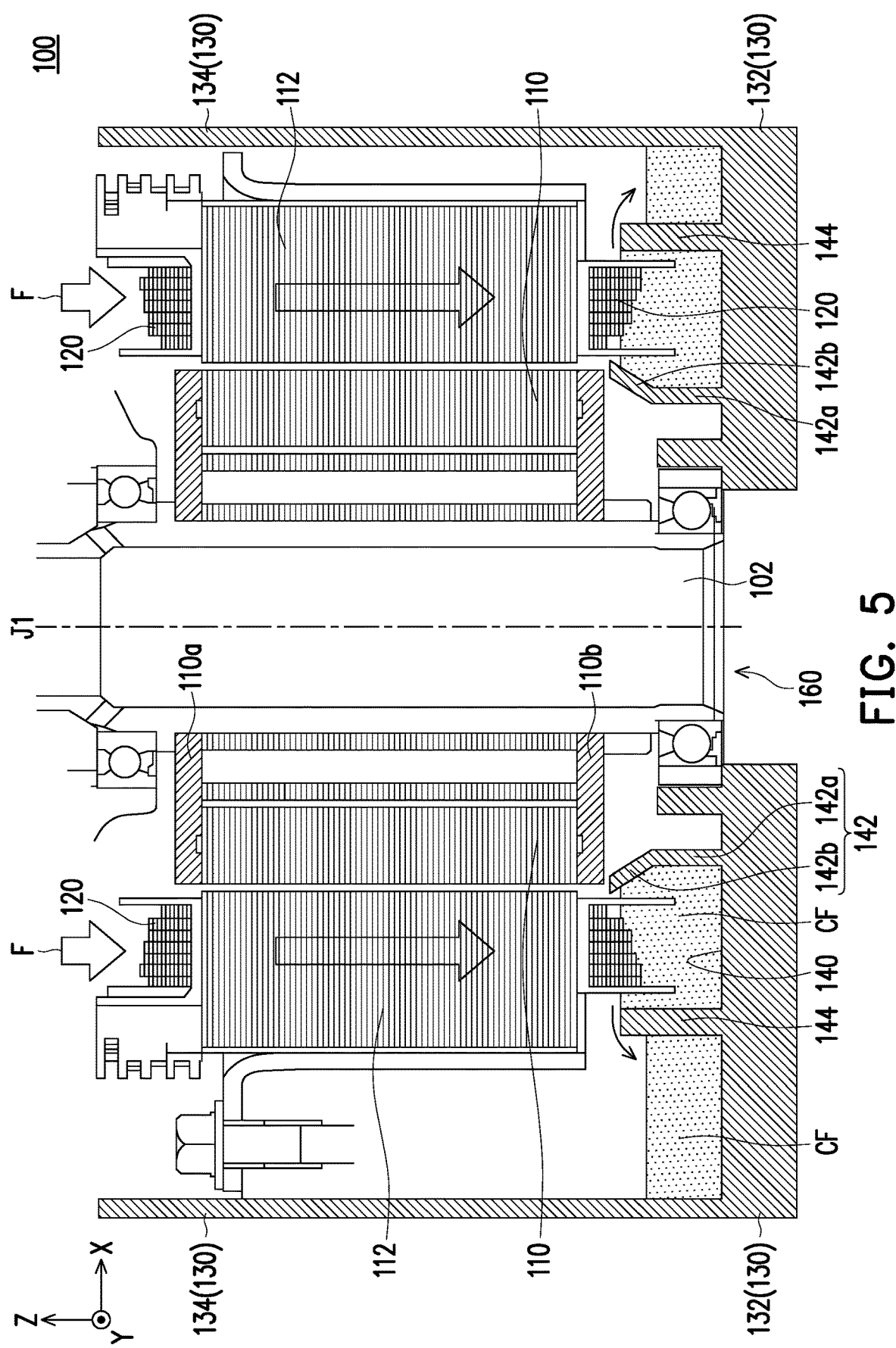
FIG. 5 illustrates a schematic cross-sectional view of a vertical motor having a cooling structure according to another embodiment of the disclosure.

FIG. 5 illustrates a schematic cross-sectional view of a vertical motor having a cooling structure according to another embodiment of the disclosure. The structure shown in FIG. 5 is also a modified structure of FIG. 3.

The structure of FIG. 5 is different from the structure of FIG. 3 in the inner peripheral side wall 142. In FIG. 5, the inner peripheral side wall 142 comprises a vertical wall portion 142a and an overhanging portion 142b. The vertical wall portion 142a of the inner peripheral side wall 142 of the oil sump 140 is also vertically arranged in the direction Z with respect to the bottom portion 132 of the housing 130. In addition, the overhanging portion 142b is arranged at a top of the vertical wall portion 142a of the inner peripheral side wall 142, and is formed in a manner that the overhanging portion 142b is inclined towards the stator side. In addition, a gap between the top of the overhanging portion 142b and the outer rim of the lower end plate 110b is arranged without affecting the rotation of the rotor 110.

In addition, according to this embodiment, the oil sump 140 may further comprise an outer peripheral side wall 144 with a height H2 as the embodiment shown in FIG. 3. The outer peripheral side wall 144 is also vertically arranged in the direction Z with respect to the bottom portion 132 of the housing 130. The outer peripheral side wall 144 is farther from the driving shaft 102 than the inner peripheral side wall 142. The outer peripheral side wall 144 and the inner peripheral side wall 142 are arranged in a manner that the winding 120 is located between the outer peripheral side wall 144 and the inner peripheral side wall 142. Therefore, when the cooling fluid CF is accumulated in the oil sump 140 surrounded by the outer peripheral side wall 144 and the inner peripheral side wall 142, the lower portion of the winding (coil) 120 can be well immersed in the cooling fluid CF and the cooling effect is improved.

In addition, although both of the outer peripheral side wall 144 and the inner peripheral side wall 142 are depicted in FIG. 5, but the structure of the inner peripheral side wall 142 with the overhanging portion 146 can be also applied to the oil sump 140 without the outer peripheral side wall 144.

In addition to the effects in the embodiment shown in FIG. 3, by providing the overhanging portion 142b of the inner peripheral side wall 142, the friction against the rotor 110 (or the driving shaft 102) can be reduced and the operation of the vertical motor can be smoother.

Figure 6:
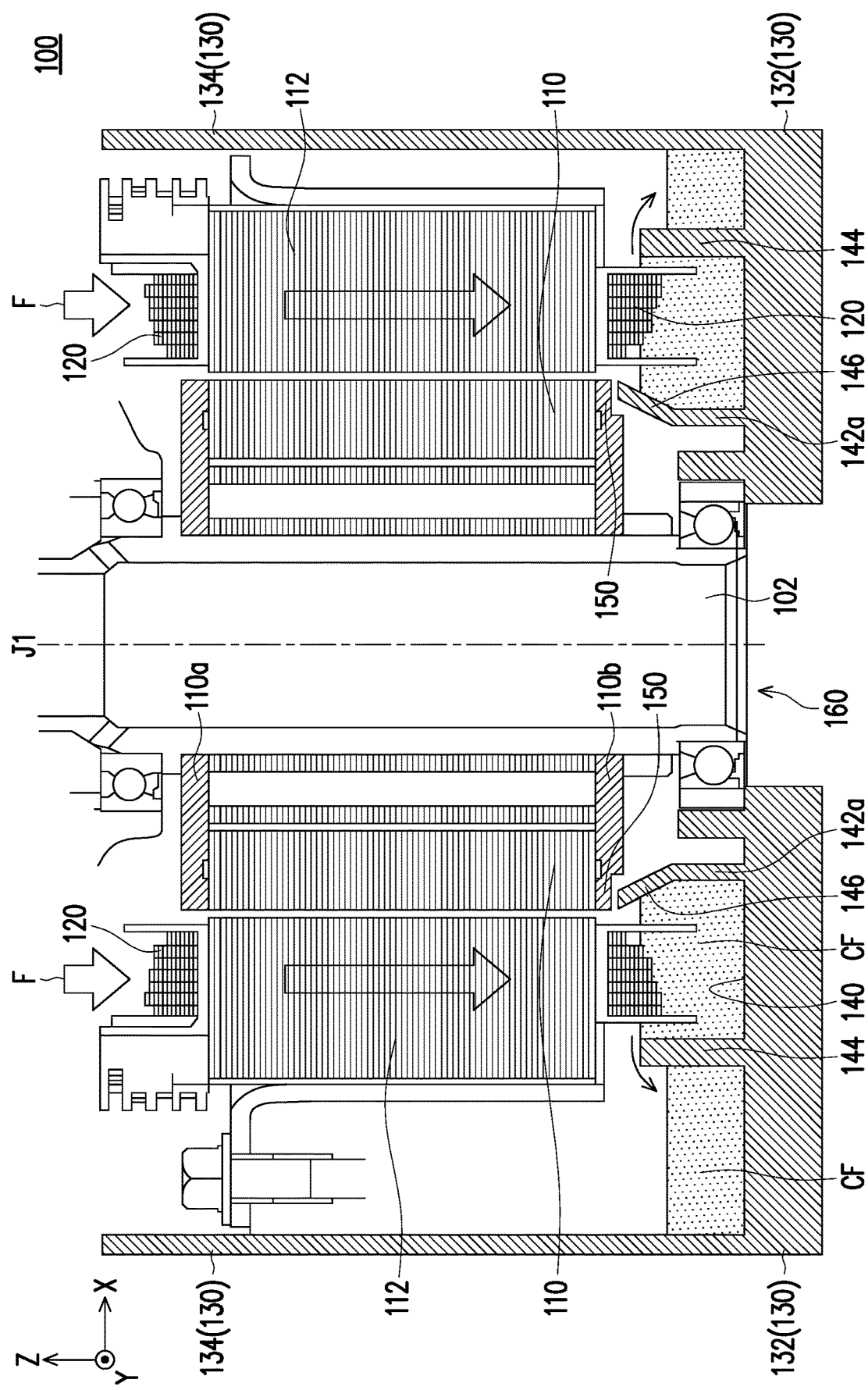
FIG. 6 illustrates a schematic cross-sectional view of a vertical motor having a cooling structure according to another embodiment of the disclosure.

FIG. 6 illustrates a schematic cross-sectional view of a vertical motor having a cooling structure according to another embodiment of the disclosure. The structure shown in FIG. 6 is a combination of structures shown in FIGS. 3 and 5.

In FIG. 6, similar to the embodiment shown in FIG. 5, the inner peripheral side wall 142 also comprises a vertical wall portion 142a and an overhanging portion 142b. The vertical wall portion 142a of the inner peripheral side wall 142 of the oil sump 140 is also vertically arranged in the direction Z with respect to the bottom portion 132 of the housing 130.

In addition, the outer peripheral side wall 144 is also vertically arranged in the direction Z with respect to the bottom portion 132 of the housing 130. The outer peripheral side wall 144 is farther from the driving shaft 102 than the inner peripheral side wall 142. The outer peripheral side wall 144 and the inner peripheral side wall 142 are arranged in a manner that the winding 120 is located between the outer peripheral side wall 144 and the inner peripheral side wall 142. In this embodiment, the height of the outer peripheral side wall 144 is also lower than the height of the inner peripheral side wall 142.

In FIG. 6, a step portion 150 is further formed at the outer rim of the lower end plate 110b of the rotor 110. Similarly, the inner peripheral side wall 142 is also aligned with the step portion 150 of the lower end plate 110b of the rotor 110. Specifically, the top of the overhanging portion 142b is aligned with the step portion 150 of the lower end plate of the rotor 110. In this manner, in comparison with structure shown in FIG. 3, the overhanging portion 142b of the inner peripheral side wall 142 may further extend to the lower end plate 110b of the rotor 110.

The gap between the top of the overhanging portion 142b of the inner peripheral side wall 142 and the step portion 150 of the lower end plate 110b of the rotor is arranged without affecting the rotation of the rotor 110.

In this embodiment, the structures of the step portion 150 and the overhanging portion 142b can further prevent the accumulated cooling fluid CF in the oil sump 140 from entering the rotor side, and the friction against the rotor 110 (or the driving shaft) can be further reduced.

Like the other embodiments, in this embodiment, when the cooling fluid CF is accumulated in the oil sump 140 surrounded by the outer peripheral side wall 144 and the inner peripheral side wall 142, the lower portion of the winding (coil) 120 can be well immersed in the cooling fluid CF and the cooling effect is improved.

Although both of the outer peripheral side wall 144 and the inner peripheral side wall 142 are depicted in FIG. 6, but the outer peripheral side wall 144 may be optional.

Furthermore, in the above embodiments, the cooling fluid flows from above the stator in the vertical direction downwards to the oil sump 140. However, the cooling fluid may be injected from an outside of the stator 112 to an inside of the stator 112 substantially in a direction to the vertical direction.

In addition, in the above embodiments, the boat is used as an example of the electrical operation machine. The other example may be an electrical lawn mower or the like, and the invention does not particular limit thereto. All electrical operation machine that equipped with a motor that is vertically arranged can adopt the embodiments of the disclosure.

In the above embodiment, the oil sump is provided with an inner peripheral side wall and an outer peripheral side wall in a manner that the winding (coil) may be surrounded by the inner and the outer peripheral side walls. Since the inner peripheral side wall is higher, when the amount of the cooling liquid exceeds a certain amount, it prevents the overflowed cooling liquid from entering the rotor side, so as to reduce the friction against the rotor or the driving shaft.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vertical motor with a cooling structure for an electrical operation machine, comprising:
 a driving shaft, having a rotational axis and arranged along a vertical direction;
 a rotor, rotating with the driving shaft;
 a stator, arranged around the rotor;
 a winding, arranged around the stator;

a housing, having a wall portion and a bottom portion and accommodating the driving shaft, the rotor, and the stator; and an oil sump, provided on the bottom portion of the housing for accumulating a cooling fluid in a manner that a lower portion of the winding is immersed in the cooling fluid, wherein the oil sump has an inner peripheral side wall, the inner peripheral side wall is vertically arranged with respect to the bottom portion of the housing and positioned at an inner side than the lower portion of the winding, wherein the rotational axis of the driving shaft extends in a direction substantially parallel to a direction of gravity.

2. The vertical motor according to claim 1, wherein the rotor is arranged between an upper end plate and a lower end plate, a step portion is formed at an outer rim of the lower end plate, and the inner peripheral side wall is aligned with the step portion.

3. The vertical motor according to claim 1, wherein the oil sump further comprises an outer peripheral side wall, and a height of the inner peripheral side wall is higher than the outer peripheral side wall.

4. The vertical motor according to claim 2, wherein the oil sump further comprises an outer peripheral side wall, and a height of the inner peripheral side wall is higher than the outer peripheral side wall.

5. The vertical motor according to claim 1, wherein the inner peripheral side wall further comprises a vertical wall portion and an overhanging portion, wherein the overhanging portion is arranged at a top of the vertical wall portion and is arranged in a manner that the overhanging portion is inclined towards the stator.

6. The vertical motor according to claim 2, wherein the inner peripheral side wall further comprises a vertical wall portion and an overhanging portion, wherein the overhanging portion is arranged at a top of the vertical wall portion and is arranged in a manner that the overhanging portion is inclined towards the stator, and an end portion of the overhanging portion is aligned with the step portion.

7. The vertical motor according to claim 3, wherein the inner peripheral side wall further comprises a vertical wall portion and an overhanging portion, wherein the overhanging portion is arranged at a top of the vertical wall portion and is arranged in a manner that the overhanging portion is inclined towards the stator.

8. The vertical motor according to claim 4, wherein the inner peripheral side wall further comprises a vertical wall portion and an overhanging portion, wherein the overhanging portion is arranged at a top of the vertical wall portion and is arranged in a manner that the overhanging portion is inclined towards the stator, and an end portion of the overhanging portion is aligned with the step portion.

9. The vertical motor according to claim 1, wherein the inner peripheral side wall is vertically arranged with respect to the bottom portion of the housing and a top of the inner peripheral side wall is aligned with an outer rim of the rotor.

10. The vertical motor according to claim 1, wherein the cooling fluid flows from above the stator in the vertical direction.

11. The vertical motor according to claim 1, wherein the cooling fluid is injected from an outside of the stator to an inside of the stator substantially in a direction to the vertical direction.

12. The vertical motor according to claim 1, wherein the electrical operation machine is a boat.

13. The vertical motor according to claim 1, wherein the electrical operation machine is an electrical lawn mower.

* * * * *